CLASS & RUBENON.
Making Extracts.
No. 41,974.
Patented Mar. 22, 1864.
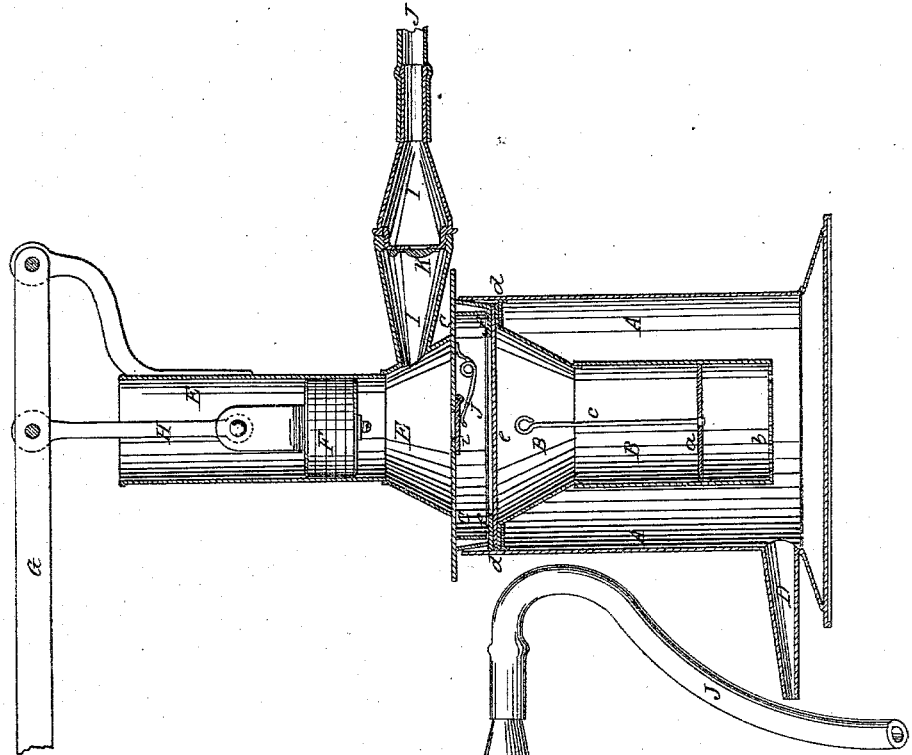
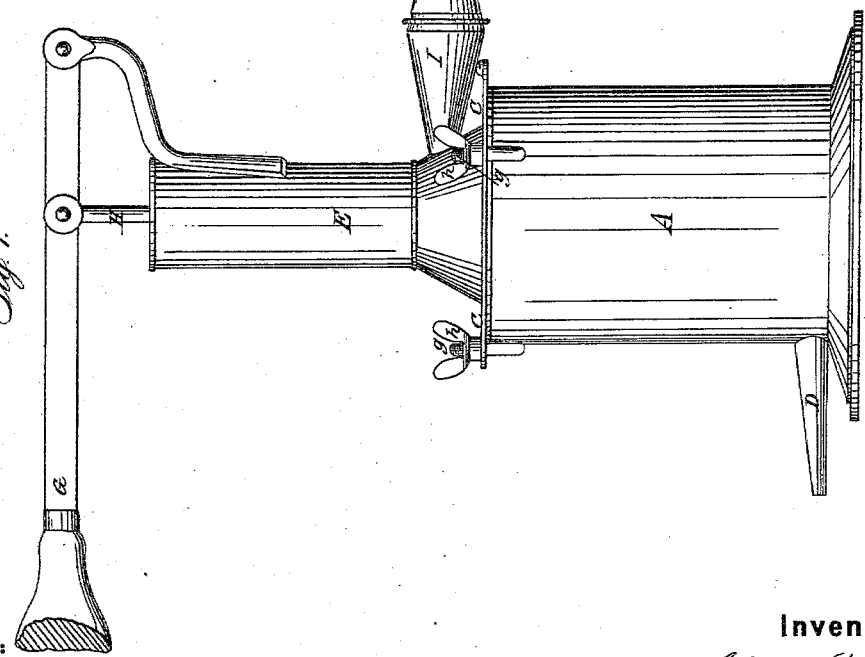
Witnesses:
Inventor:

UNITED STATES PATENT OFFICE.

WILLIAM CLASS AND ERNST RUBENOW, OF CINCINNATI, OHIO.

IMPROVED APPARATUS FOR MAKING EXTRACTS.

Specification forming part of Letters Patent No. 41,974, dated March 22, 1864.

*To all whom it may concern:*

Be it known that we, WILLIAM CLASS and ERNST RUBENOW, of the city of Cincinnati, county of Hamilton, and State of Ohio, have invented certain new and useful Improvements in Filters for Making Coffee, Tea, or other Extracts; and we do hereby declare the following to be a full, clear, and exact description of the construction and operation of the same, reference being had to the accompanying drawings, making a part of this specification, in which—

Figure 1 represents an elevation of the filter, and Fig. 2 represents a vertical section through the same.

Similar letters of reference where they occur in the separate figures denote like parts of the apparatus in both of the drawings.

The object and purpose of our invention is to facilitate the making of coffee, tea, or other extracts or infusions, and filtering the same by means of apparatus cheap and easily managed, and not liable to become clogged or disarranged.

To enable others skilled in the art to make and use our invention, we will proceed to describe the same with reference to the drawings.

A represents a cylindrical receiver, which has within it a removable cup, B, furnished with perforated bottoms $a\ b$, and with a stem or rod, $c$, by which it may be removed or replaced readily.

D is an exit-pipe or flow-off, placed at or near the bottom of the receiver, and may be furnished with a draw-cock, if desired.

The cup B is suspended by a flange, $d$, and over the top of the cup is placed a piece of buckskin, felt, or other suitable filtering medium, $e$, and over this is placed the cover $c$, which rests upon a packing-disk, $f$, to make it fit tight, and is held firmly in place by the screws $g$ and nuts $h$.

On top of the cover C there is affixed a pump-cylinder, E, in which a piston or plunger, F, works, said plunger being operated by means of a lever or brake, G, to which the plunger-rod H is attached. There is a valve, $i$, which covers an opening in the cover C, said opening being immediately under the pump-cylinder. This valve opens inward toward the interior of the receiver A, and is held closed by a spring, $j$, when there is no undue or artificial pressure upon it externally.

Communicating with the pump-cylinder E there is an inclosed passage, I, which is furnished with a valve, $k$, opening inward, and to the end of this inclosed passage or way a hose, J, or pipe may lead to the liquid to be used in the apparatus.

The operation is as follows: Suppose coffee, tea, or any other extract or infusion is to be made. The material is placed in the cup B, the bottom $b$ of which may have over its perforations felt, flannel, or other similar filtering substance. The pipe or hose J is placed in the hot or boiling water. Now, by operating the pump-piston F, or raising it up, the hot water will be drawn up through the pipe or tube J, through the passage I, and valve $k$, and into the pump-cylinder E. Then, by allowing the piston to remain at rest upon the column of water in E the water will pass through the valve $i$, through the filtering medium $e$, thence through the material in the cup B, of which the extract, infusion, or decoction is to be made, thence through the bottoms $a\ b$, and to the exit-pipe D. This flow may be gradual and slow, or it may be expedited by lowering the piston E, the valve $k$ preventing the liquid from flowing back through the inlet-passage I or in any other direction than that through the filtering-diaphragms.

If it be a liquid that is simply to be filtered without making an extract or infusion, then the cup B is cleaned out and only a felt or flannel covering left upon the lower perforated bottom, $b$, or upon $a$ and $b$, and the pipe or hose J is inserted in the liquid that is to be filtered, and the same operation gone through as above described in the case of making an extract from any substance.

Having thus fully described the construction and operation of our apparatus, what we claim therein as new, and desire to secure by Letters Patent, is—

The arrangement of the pump, valves, and filtering medium, herein described and represented, between the inlet and exit passages I D, for purpose of making coffee, tea, or other extracts, or for the purpose of filtering any liquid, as herein represented and set forth.

WILLIAM CLASS.
ERNST RUBENOW.

Witnesses:
W. CHUDSEY,
WILLIAM HARBIG.